United States Patent
Bouvrette et al.

(10) Patent No.: US 7,232,474 B2
(45) Date of Patent: Jun. 19, 2007

(54) PROCESS FOR PRODUCING GOLD NANOPARTICLES

(75) Inventors: Pierre Bouvrette, Montreal (CA); Yali Liu, Montreal (CA); John H. T. Luong, Montreal (CA); Keith B. Male, Montreal (CA)

(73) Assignee: National Research Council of Canada, Ottawa (CA)

( * ) Notice: Subject to any disclaimer, the term of this patent is extended or adjusted under 35 U.S.C. 154(b) by 177 days.

(21) Appl. No.: 10/886,627

(22) Filed: Jul. 9, 2004

(65) Prior Publication Data

US 2005/0153071 A1   Jul. 14, 2005

(51) Int. Cl.
B22F 9/24 (2006.01)
(52) U.S. Cl. .................... 75/362; 75/371; 977/777
(58) Field of Classification Search ................ 75/362, 75/371
See application file for complete search history.

(56) References Cited

U.S. PATENT DOCUMENTS 6,025,202 A * 2/2000 Natan .................... 436/104
6,361,944 B1 * 3/2002 Mirkin et al. ................ 435/6
2002/0177143 A1 * 11/2002 Mirkin et al. ................ 435/6
2003/0108612 A1 * 6/2003 Xu et al. .................... 424/489

OTHER PUBLICATIONS

Michels, Jasper J. et al., "Dendrimer-cyclodextrin assemblies as stabilizers for gold and platinum nanoparticles", J. Chem. Soc., Perkin Trans. 2, pp. 102-105, published Nov. 19, 2001.*

* cited by examiner

Primary Examiner—George Wyszomierski
(74) Attorney, Agent, or Firm—George A. Seaby

(57) ABSTRACT

Gold nanoparticles having a particle size of 4-15 nM are synthesized by the reduction of hydrogen tetrachloroaurate (III) trihydrate using a suitable reducing agent such as sodium citrate in the presence of unmodified α, β or γ-cyclodextrin. The particle size is dependent upon the type and concentration of cyclodextrin and the reducing agent concentration. Gold nanoparticles having a particle size of 2-4 nM are produced by the reduction of hydrogen tetrachloroaurate (III) trihydrate using sodium borohydride in the presence of cyclodextrins.

5 Claims, 9 Drawing Sheets

(A)

(B)

(A)

(B)

(A)

(B)

(A)

(B)

US 7,232,474 B2

PROCESS FOR PRODUCING GOLD NANOPARTICLES

BACKGROUND OF THE INVENTION

Field of the Invention

This invention relates to a process for producing gold nanoparticles.

Nanomaterials with size-dependent physical properties provide a plethora of opportunities for diversified and novel applications. In particular, gold nanoparticles are very attractive for research in nanotechnology because of their appealing features. For example, $TiO_2$-supported gold nanoparticles display highly selective catalytic activity for CO oxidation at −70° C. [M. Haruta, *Catalysis Today* 1997, 36, 153], while particles with diameters of 3-5 nm show a drastic decrease of the melting point. [Ph. Buffat et al, *Phys. Rev.* 1976, A13, 2287]. Moreover, non-toxic gold colloids, readily and inexpensively prepared by chemical reduction of $HAuCl_4$, are capable of forming active complexes with many biological substances. [G. B. Birrell et al, *J. Histochem. Cytochem.* 1987, 35, 843]. Depending on the reducing agent employed, the particle size of the colloids can vary from 1-100 nm. [D. E. Handley In *Colloidal Gold—Principles, Methods, and Applications*; Hayat, M. A., Ed.; Academic Press: New York, 1989; Vol 1, Chapter 2, pp 13-32]: The sodium citrate reduction procedure pioneered by G. Frens [*Nature Phys. Sci.* 1973, 241, 20] is one of the most commonly cited methods for colloidal gold synthesis to produce nanoparticles with sizes of 12-64 nm, depending upon the citrate/$HAuCl_4$ ratio. In immunocytochemistry, the use of smaller gold particles is preferred since steric hindrances are often encountered with larger particles, which can significantly reduce the number of sites for labeling. [G. B. Birrell et al, supra]. These small-diameter particles (3-6 nm) are often made using white phosphorus, sodium borohydride or a mixture of trisodium citrate and tannic acid as reducing agents [D. E. Handley, supra]. It is also of importance to be able to prepare monodispersed nanoparticles with a very narrow size distribution to exploit the size and quantum confinement effects of nanoparticles and to tailor nanomaterials with new properties.

The nanostructure of Au or Ag films have been characterized by a wide range of analytical techniques including atomic force microscopy (AFM) [R. B. G. de Hollander et al *Ultramicroscopy* 1995, 57, 263] field emission scanning electron microscopy (FE-SEM) [M. Naitoh et al *Jpn. J. Appl. Phys.* 1992, 31, 4018], transmission electron microscopy (TEM) [W. J. Krakow *Appl. Phys.* 1990, 69, 2206; C. A. Davis et al, *Opt. Commun.* 1991, 85,70; M. Arai et al, *J. Colloid Interface Sci.* 1994, 168, 473; and S. Blacher et al *J. Appl. Phys.* 1993, 74, 207], near-field scanning optical microscopy (NSOM) [U. C. Fischer *J. Opt. Soc. Am. B.* 1986, 3, 1239], scanning tunneling microscopy (STM) [M. Rucker et al *J. Appl. Phys.* 1992, 72, 5027] and photon STM [P. Dawson *Phys. Rev. Lett.* 1994, 72, 2927]. Gold nanoparticles have been studied by AFM [R. H. Terrill et al *J. Am. Chem. Soc.* 1995, 1117, 12537 and W.-L Shaiu et al *J. Vac. Sci. Technol. A* 1993, 11, 820], TEM [M. Giersig et al Langmuir 1993, 9, 3408 and G. Chumanov et al *J. Phys. Chem.* 1995, 99, 9466], and SEM [I. G. Casella et al *Analyst* 1996, 121, 249 and A. Doron et al *Langmuir* 1995, 11, 1313] for the characterization of gold colloid monolayers. A recent comparison of four techniques, AFM, FE-SEM, TEM, and NSOM concludes that a combination of at least one scanning probe method (AFM, NSOM) and one accelerated-electron method (TEM, FE-SEM) is required to obtain the most accurate information regarding the nanometer-scale architecture of the particle-based surfaces. [K. C. Graber et al *Anal Chem.* 1997, 69, 471]. Sample preparation is also a key and crucial factor for obtaining good AFM imaging. The formation of self-assembled monolayers (SAMs) on various surfaces such as glass [J. H. Fendler *Chem. Mater.* 2001, 13, 3196], silicon [Z. Tang et al Langmuir 2002, 18, 7035 and D. Li et al *J. Am. Chem. Soc.* 1998, 120, 8797] and gold [H. X. Xe et al *Langmuir* 2000, 16, 3846] has been previously examined. In these procedures, the SAMs were prepared using compounds and polymers such as polyethylenimine (PEI), (3-aminopropyl)triethoxysilane (APTES), poly(diallyldimethylammonium) chloride (PDDA), poly(dimethyl) siloxane (PDMS), and n-octadecyltrichlorosilane (OTS) and alkanethiols. PDDA-modified silicon substrates have shown a distinct advantage over PEI and APTES modified substrates with respect to their very low surface roughness and surface height difference [Z. Tang et al, supra]. The roughness and largest surface height difference for the PDDA-modified silicon is 0.10 nm and 0.4 nm, while the corresponding values for PEI are 0.14 nm and 0.6 nm and for APTES 0.29 nm and 1.0 nm. In such preparation, CdSe/CdS colloids are absorbed on PDDA-modified silicon to form a homogeneous close-packed monolayer with little aggregation or multi-layer formation. Molecular self-assembly that exploits charge attraction between oppositely charged materials such as positively charged PDDA and negatively charged nickel phthalocyanine (NiPc), [D. Li et al, supra], cobalt phthalocyanine tetrasulfonate ($Co^{II}PcTS^{4-}$) [Y. M. Lvov et al, *J. Colloid Interface Sci.* 1999, 212, 570] 1:12 molybdosilicate acid ($SiMo_{12}$) [L. Li et al Mater. *Chem. Phys.* 2001, 69, 45] have been used to successfully fabricate multi-layered structures in a layer-by-layer manner on gold electrodes. Therefore, for the immobilization of small gold nanoparticles, PDDA could be the best candidate for SAM formation on the glass slide substrate to be used in conjunction with AFM measurements.

Cyclodextrins (CDs) and modified cyclodextrins have been chemisorbed onto gold electrodes[M. T. Rojas et al *J. Am. Chem. Soc.* 1995, 117, 336; P. He et al *Anal. Chim. Acta.* 1997, 337, 217 and I. Suzuki et al *Mater. Sci. Eng. C.* 2001, 17, 149], gold films [M. Weisser et al *Sens. Actuators. B.* 1997, 38/39, 58 and D. Velic et al *J. Mol. Struct.* 2001, 598, 49], gold-coated AFM cantilevers [C. A. Tipple et al *J. Anal. Chem.* 2002, 74, 3118] and gold electrodes of a quartz microbalance [S.-C. Ng et al *Tetrahedron Lett.* 2002, 43, 2863] to exploit the host-guest interactions of cyclodextrins with solution partners. Per-6-thio-β-CD [J. Liu et al *J. Am. Chem. Soc.* 1999, 121, 4304] and mono-6-lipoyl-amido-2, 3,6-O-permethyl-β-CD [T. Carofiglio et al *Tetrahedron Lett.* 2001, 42, 5241] have been added directly to gold nanoparticle solutions to form cyclodextrin-modified gold nanospheres. Recently, perthiolated cyclodextrins have been used to modify gold nanospheres by their addition directly to the gold solution during its reduction [J. Liu et al *J. Am. Chem. Soc.* 2001, 123, 11148 and J. Liu et al, *Langmuir* 2000, 16, 3000]. In these studies, $HAuCl_4$ was reduced by sodium borohydride in the presence of perthiolated CDs in a solvent (either DMSO or dimethylformamide) milieu. The CDs bind directly to the gold surface through the SH functionality and the size of the gold nanoparticles formed was dependent upon the concentration and type (α,β, or γ) of CD employed. The smallest particles were formed with γ-SH-CD followed by β-SH-CD and α-SH-CD, while increasing the ratio of CD/$AuCl_4^-$ decreased the particle size.

In spite of the advances outlined above, there are still problems encountered in the preparation of stable gold nanoparticles. In some cases, the chemicals used to stabilize the nano'particles may not be compatible with the desired applications for the particles. Moreover, the control of the size and distribution of nanoparticles is of concern, since smaller particles (less than 10 nm) are known to have improved electrochemical properties and greater sensitivity and resolution with respect to labeling procedures. However, smaller particles tend to be more unstable and easily undergo aggregation. Many of the aforementioned procedures for the preparation of smaller gold nanopaticles result in unstable colloids which rapidly aggregate and are not very useful for various applications. Although successful, many of the stabilization procedures for gold nanoparticles lead to colloid solutions which may not be very useful for chemical modifications and sensing applications due to both ionic repulsion and the known denaturing effects with respect to enzymes and proteins of surfactants such as SDS.

SUMMARY OF THE INVENTION

The object of the present invention is to provide a process for producing gold nanoparticles which results in relatively stable nanoparticles and which makes it possible to control the size and distribution of produced nanoparticles.

Accordingly the invention relates to a process for producing gold nanoparticles comprising the step of reducing hydrogen tetrachloroaurate (III) trihydrate with a reducing agent in the presence of an α, β or γ-cyclodextrin

BRIEF DESCRIPTION OF THE DRAWINGS

This invention is described below with reference to the accompanying drawings, wherein.

DETAILED DESCRIPTION OF THE INVENTION

Preparation of Gold Nanoparticles

Figure 1:
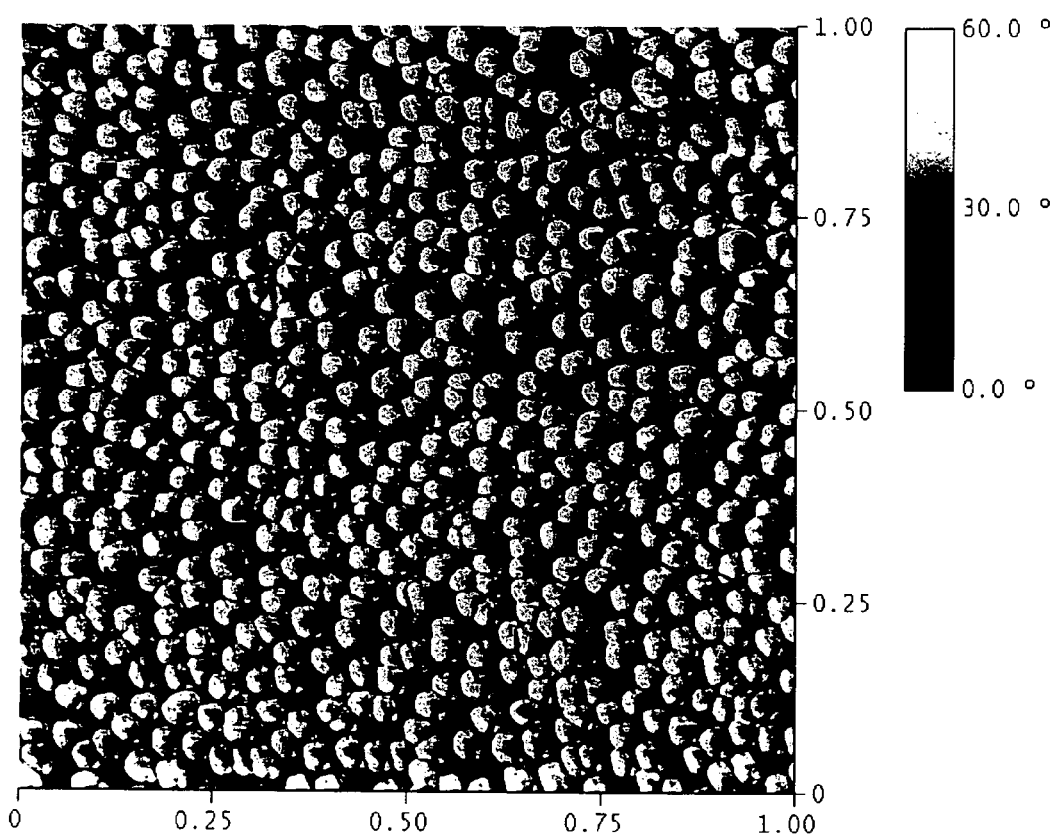
FIGS. 1 and 2 are atomic force microscopy micrographs of gold nanoparticles at various dilutions made before immobilization at phase image-x,y scale of 1 µm.

Glassware was cleaned in aqua regia (nitric acid/hydrochloric acid: 1/3) and all solutions were prepared using Milli Q (Millipore, Bedford, Mass.) A-10 gradient (18 MΩ cm) deionized water. The reaction (100 mL final volume) was performed in a 3-neck 500 mL round bottom flask with the center neck attached to a reflux condenser. The flask was set in a heating mantle with a magnetic stirrer to provide continuous mixing. Gold nanoparticles were prepared by the method of Storhoff et al [J. J. Storhoffet al *J. Am. Chem. Soc.* 1998, 120, 1959] with slight modifications. A 20 mL solution of 5 mM hydrogen tetrachloroaurate (III) trihydrate (99.9%, Aldrich, Milwaukee, Wis.) was added to the flask and the volume was made up to 90 mL with water. Cyclodextrin powders were added to the flask through one of the open necks to obtain final concentrations: 1-25 mM for β-cyclodextrin hydrate (Aldrich, MW, 1135), 5-50 mM for both α-cyclodextrin (Aldrich, MW, 972) and γ-cyclodextrin (Wacker Chemicals, Norwalk, Conn., MW, 1297). The resulting solution was heated until boiling and then 10 mL of 40 mM sodium citrate were rapidly added to the flask. The solution changed color rapidly (10-40 s) from clear to a murky gray color indicating nucleation. Within 2 min the color changed to burgundy red, an indication of gold nanoparticle formation. The solution was allowed to reflux for a further 15 min and then was cooled to room temperature. Solutions were filtered (0.45 µm filters, Millipore) and stored at 4° C. This procedure was essentially the same as the commonly cited method of Frens [supra] except that the starting concentrations of gold and sodium citrate are 4.0 and 3.3-fold higher, respectively. The concentration of sodium citrate was also altered to evaluate its effect on the gold nanoparticle size.

Gold nanoparticles were also prepared by the reduction of hydrogen tetrachloroaurate (III) trihydrate with sodium borohydride by the method of Birrell et al [supra] with minor modifications. In brief, 0.25 mM $HAuCl_4$ (50 mL) was prepared and then 100 µL aliquots of freshly prepared 0.1 M sodium borohydride ($NaBH_4$) were added at 22° C. to the slowly mixing solution of gold until a stable orange colored colloid was observed (≅0.8-1.2 mL $NaBH_4$). The reaction was left for 18 hr at 22° C. and finally, solutions were filtered as described earlier and stored at 4° C. The nanoparticles were also prepared in the presence of 10 mM α-CD, β-CD or γ-CD in the hydrogen tetrachloroaurate (III) trihydrate solution. All chemicals were of analytical reagent grade and used as received without any further purification.

Immobilization of Gold Nanoparticles on Modified Glass Surface

Glass microscope slides (25×75×1 mm, Fisher, Fair Lawn, N.J., Cat# 12-552) were cut into smaller pieces (25×10 mm) and carefully cleaned by soaking in a solution of nitric acid/water (50/50%) for 20 min. Rinsed slides were immersed in Piranha solution (70% concentrated sulfuric acid: 30% hydrogen peroxide, 7:3) for 20 min and extensively rinsed with water. Cleaned glass slides were dried under a nitrogen stream and immersed in 0.01 M poly (diallyldimethylammonium chloride), (PDDA, MW 200, 000-350,000, Aldrich) for 16 h. The concentration was based on the monomer molecular weight of 161 and takes into account that the polymer solution was only 20%, i.e., 0.161 g of polymer was used to prepare a 20 mL solution. The resulting glass slides were thoroughly rinsed with deionized water and dried under a nitrogen stream. The polymer-coated slides were subsequently incubated for 2-3 h with the gold nanoparticle solutions described above. In order to obtain AFM images with homogeneously dispersed gold nanoparticles the solutions were diluted 50- to 200-fold, depending upon the cyclodextrin concentration in the sample.

Measurements and Characterization

UV-vis spectroscopy measurements (300-800 nm) were performed using a Beckman spectrophotometer (DU-640, Fullerton, Calif.) at room temperature with a 1-cm optical, length cuvette. Gold nanoparticle solutions prepared above were diluted 5-fold before measurement and their stabilities were monitored with time under various conditions. AFM images were obtained using a Nanoscope IV (Nanoscope IV, Digital Instruments-Veeco, Santa Barbara, Calif.) with a silicon tip operated in tapping mode to characterize the various gold nanoparticle preparations. The mean particle size and standard deviation was then calculated for each sample. The images obtained by AFM were not manipulated, altered or enhanced in any way. A transmission electron microscope (TEM Philips CM20, Philips, FEI, Hillsboro, Oreg.) equipped with a Gatan UltraScan CCD camera was used for gold nanoparticle characterization. Images were taken under 200 kV and TEM resolution can be achieved to 0.25 nm. A few drops of sample solution-were placed on a 300 mesh carbon-coated copper grid with holey carbon film and dried at room temperature before TEM examination. For each TEM image, the mean particle size and standard deviation was calculated from either the particle area or perimeter/length mode using Scion Image (Scion Corp., Frederick, Md.) based on the popular NIH Image on the MacIntosh platform. For each sample, analysis was performed on four (gold nanoparticles formed by sodium citrate reduction) or two (gold nanoparticles formed by sodium borohydride reduction) TEM images of various sizes such that between 30-350 particles could be observed.

Solution phase FT-Raman spectra were recorded using a Bruker FRA 106 spectrometer (Bruker Optics, Milton, ON, Canada) equipped with a liquid nitrogen-cooled germanium detector and a 1064 nm Nd:YAG laser. Samples were mounted inside the instrument using a 0.5 cm quartz cuvette with a mirrored rear surface. The Raman spectrum was collected within the 0-4000 $cm^{-1}$ interval with 4 $cm^{-1}$ resolution using 500 mW of excitation laser power. Solution phase FT-IR spectra were recorded using an ASI Applied Systems (Mettler-Toledo company) ReactIR-4000 spectrometer (Millersville, Md.) equipped with a purge gas generator from Parker Balston (Haverhill, Mass.). The Ft-IR spectrum was collected within the 600-4000 $cm^{-1}$ interval.

The CD-gold colloids were examined by a triple quadropole mass spectrometer (API III LC/MS/MS, Sciex, Thornhill, ON, Canada) to monitor the possible degradation or modification of CD during the course of the citrate reduction of hydrogen tetrachloroaurate (III) trihydrate. Ammonated species of CD were generated by spraying the sample solution (ammonium acetate in methanol) through a stainless steel capillary held at 4-6 kV. The sample solution was delivered to the sprayer by a syringe infusion pump through a fused silica capillary of 100 μm I.D. at 1 μL/min. A gas curtain formed by a continuous flow (0.6-0.8 L/min) of $N_2$ in the interface region served to evaporate the aerosol droplets and to break up the cluster formation from supersonic expansion. The potential on the sampling orifice of the instrument was set at +50 V.

Characterization of Gold Nanoparticles by UV-vis Spectroscopy

Gold nanoparticles formed by the reduction of hydrogen tetrachloroaurate (III) trihydrate with sodium citrate exhibited a red color and upon dilution (5-fold) revealed a strong absorption (0.6-0.7) with the characteristic peak at 518-520 nm. The addition of cyclodextrins at high concentration (>15 mM) to the reaction mixture resulted in a slight shift to shorter wavelengths (516-518 nm), an indication of a decrease in the gold nanoparticle diameter size. However, in the presence of 15 mM β-CD, decreasing the concentration of sodium citrate (0.33-0.50 fold) added to the reaction mixture resulted in a shift to longer wavelengths (522-534 nm), indicating an increase in the gold nanoparticle diameter size. The times until nucleation and the red color development were faster (10 and 45 s, respectively) in the presence of cyclodextrins compared to in the absence of cyclodextrins (40 and 90 s, respectively). The sample solutions (diluted five-fold) were monitored with time at room temperature, 4° C., in the dark, plus and minus cyclodextrins. Samples left at 4° C. were more stable than those at room temperature whereby precipitation was often observed. Sample storage in the dark exhibited no effect on the nanoparticle stability. Samples at 4° C. containing cyclodextrins were stable for at least 3 months whereas the sample without cyclodextrin lost 10-15% of its initial absorbance during the same time period. The stock sample of gold nanoparticles with 25 mM β-CD was not stable at 4° C. due to the insolubility of the cyclodextrin upon cooling. Gold nanoparticle stock solutions with 15 mM β-CD and citrate: Au ratios less than 1.3:1 also precipitated. Gold nanoparticles formed by the reduction of hydrogen tetrachloroaurate (III) trihydrate with sodium borohydride were also red in color and revealed a strong absorption (0.6-0.7) with the characteristic peak at 515-517 nm. The addition of cyclodextrins (10 mM) to the reaction mixture resulted in a shift to shorter wavelengths (510-512 nm), indicating a decrease in the gold nanoparticle diameter size.

Characterization of Gold Nanoparticles by AFM

Figure 2:
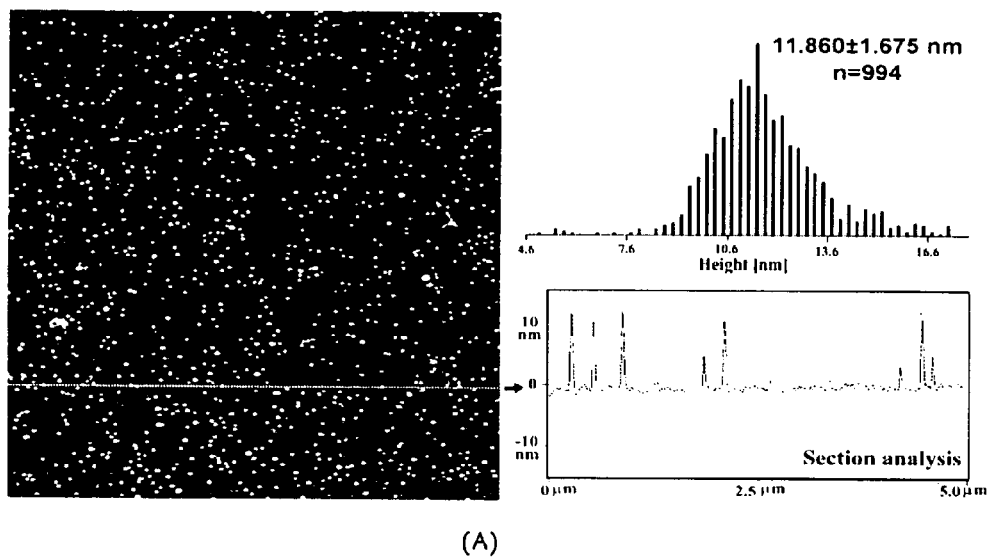
Figure 2:
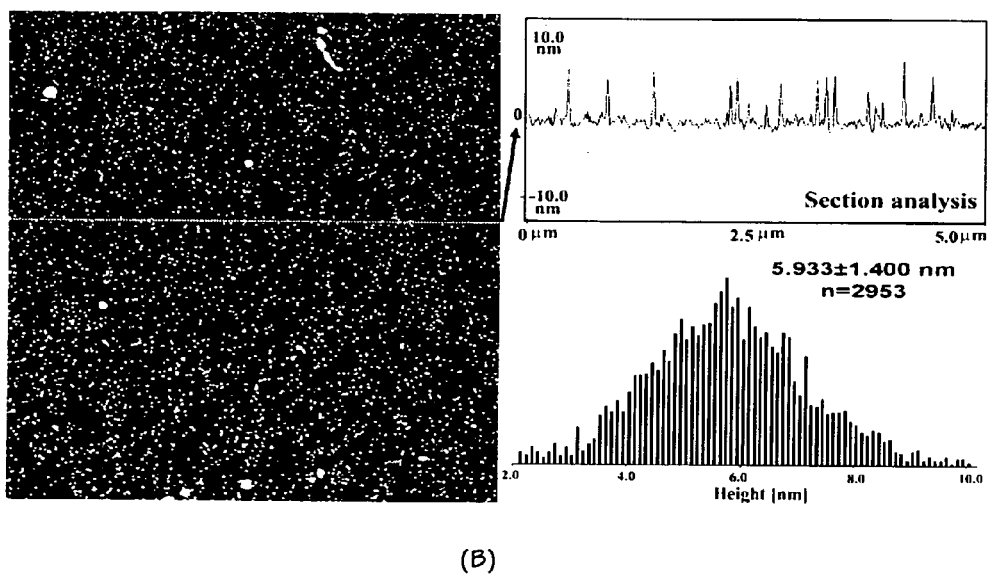

Gold nanoparticles prepared by sodium citrate reduction in the absence of cyclodextrins, were immobilized on PDDA treated glass slides and analyzed with AFM. A nanoparticle monolayer was formed on the PDDA polymer after just 2-3 hours with a surface roughness of 3.8 nm, indicating a very uniform layer. However, once the sample was diluted 4-fold, as shown in FIG. 1, a nanoparticle semi-mono layer (11, 9 nm) was observed after 2-3 hours. The gold nanoparticles formed a very homogeneous close-packed semi-monolayer with little aggregation or multi-layer formation. As shown in FIG. 2, excellent gold nanoparticle dispersion was observed (FIG. 3) when the sample was diluted 50-fold and thus height analysis could easily be performed. The particle size for this image was determined to be 11.9±1.7 nm (n=994) and the largest surface height difference for the PDDA-modified glass (section with no gold nanoparticles) was about 0.8 nm which was similar to the value reported for PDDA-modified silicon [Z. Tang et al, supra] The average particle size obtained for three different samples ranged between 12-15 nm with an average of 13.3 nm. As predicted from UV-vis measurements, the size of the gold nanoparticles decreased as the concentration of β-CD increased. The smallest particles were obtained at 15 mM β-CD and the average particle size obtained from three different samples ranged between 4.6 and 6.1 nm with an average of 5.4 nm. A sample diluted 200 fold and left refrigerated at 4° for three months was reanalyzed by AFM as shown in FIG. 2B. The particle size remained virtually unchanged (5.9±1.4, n=2593) with insignificant aggregation, indicating very good stability of the gold nanoparticles in the presence of cyclodextrin.

Figure 3:
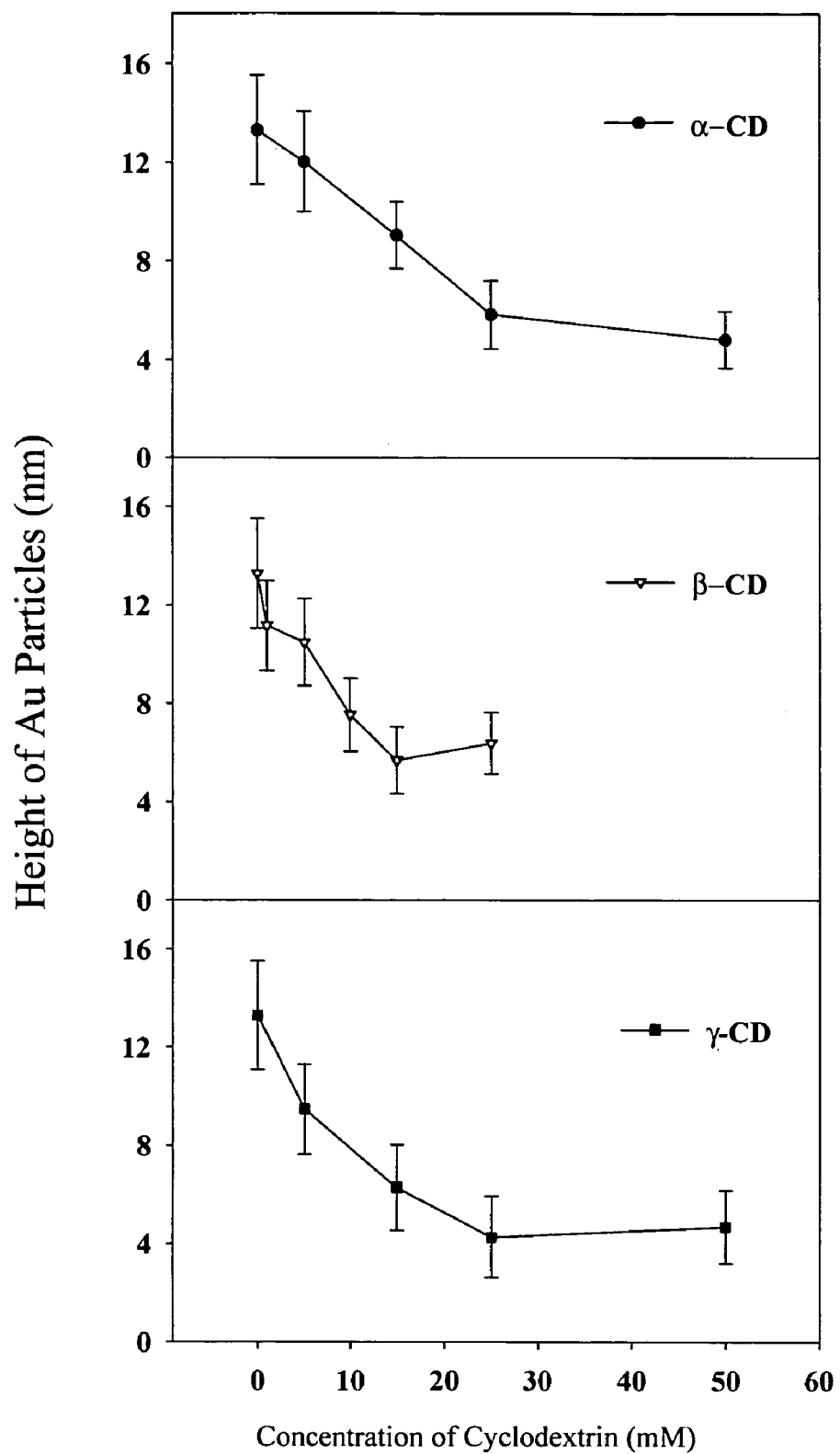
FIG. 3 shows three graphs illustrating the effect of concentration on the size of gold nanoparticles.

FIG. 3 illustrates the effect of the concentration of the three cyclodextrins on the particle size. As observed, gold nanoparticle size was also reduced upon the addition of α-CD and γ-CD. However, the smallest particles were observed at CD concentration of 25-50 mM rather than 15 mM, as was the case with β-CD. The smallest particle sizes were 4.8±1.2 nm (n=889) and 4.3±1.7 nm (n=1278) for α-CD and γ-CD, respectively. Since the CDs would exhibit hydrophobic interactions with embryonic gold nanoparticles [A. V. Kabashin et al *J. Phys. Chem. B* 2003, 107, 4527], the consecutive particle growth due to the mutual coalescence between such nanoclusters would be severely limited or terminated as the CD concentration increased. The gold nanoparticle solutions in the presence of CDs were diluted 200-fold instead of only 50-fold to obtain a good dispersion of particles. Since the immobilization procedure with PDDA modified glass was dependent upon the starting particle concentration, the solutions with smaller gold nanoparticles produced in the presence of CDs would have to be diluted more to attain a similar particle density. Undiluted gold nanoparticles (prepared in the presence of 15 mM β-CD) immobilized on PDDA-modified glass also formed a very uniform monolayer after 2-3 h. The surface roughness was just 2.4 nm compared to the value of 3.8 nm observed in the absence of CDs, and this difference was likely due to the smaller particle size.

Characterization of Gold Nanoparticles by TEM

Figure 4:
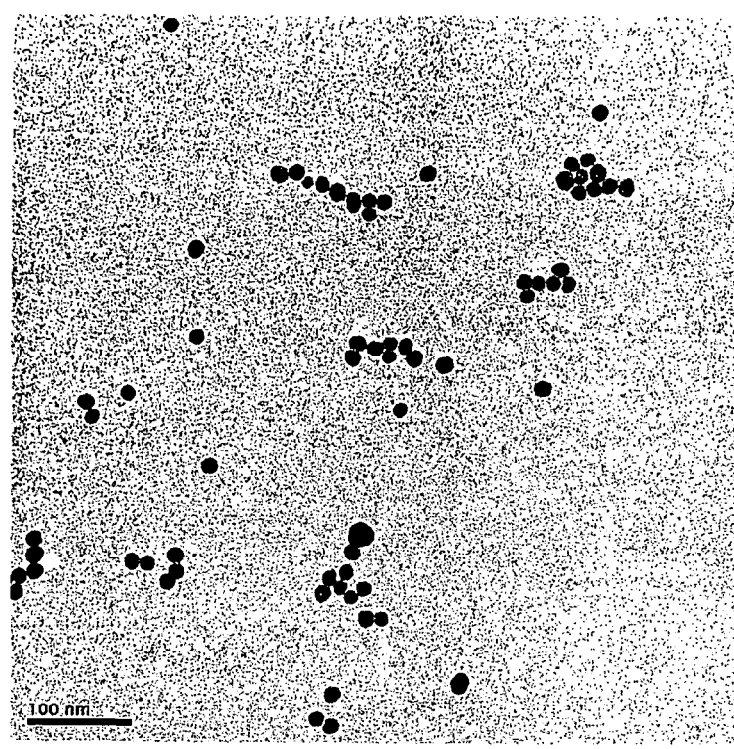
FIGS. 4A and 4B are transmission electron microscopy micrographs of gold nanoparticles.
Figure 4:
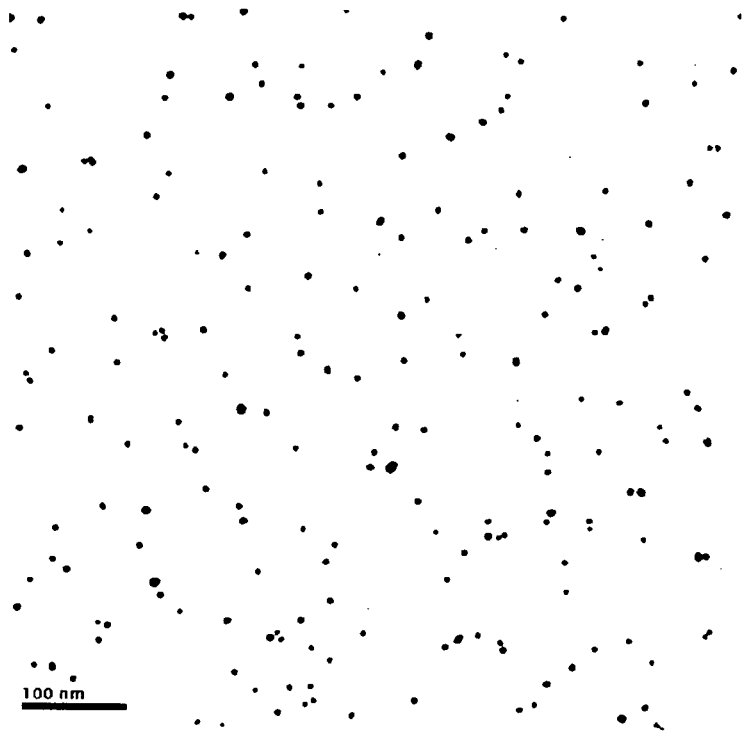

TEM micrographs taken at 200 kV of gold nanoparticles in the absence of cyclodextrin (FIG. 4A) and in the presence of 25 mM α-CD (FIG. 4B) show the homogeneity of the samples as well as the expected spherical shape of the small gold nanoparticles. The average size of gold nanoparticle in the absence of cyclodextrins (four different images) was determined to be 14.4±1.2 nm (n=177), which matched well with the value (13.3 nm) determined by AFM. The average particle sizes in the presence of 25 mM α-CD, 15 nM β-CD and 25 mM γ-CD (four different images) were 6.7±1.0 nm (n=715), 6.6±1.2 nm (n=831), and 6.0±1.3 nm (n=370), respectively, which also agreed well with the corresponding AFM results of 5.8, 5.4 and 4.3 nm.

Figure 5:
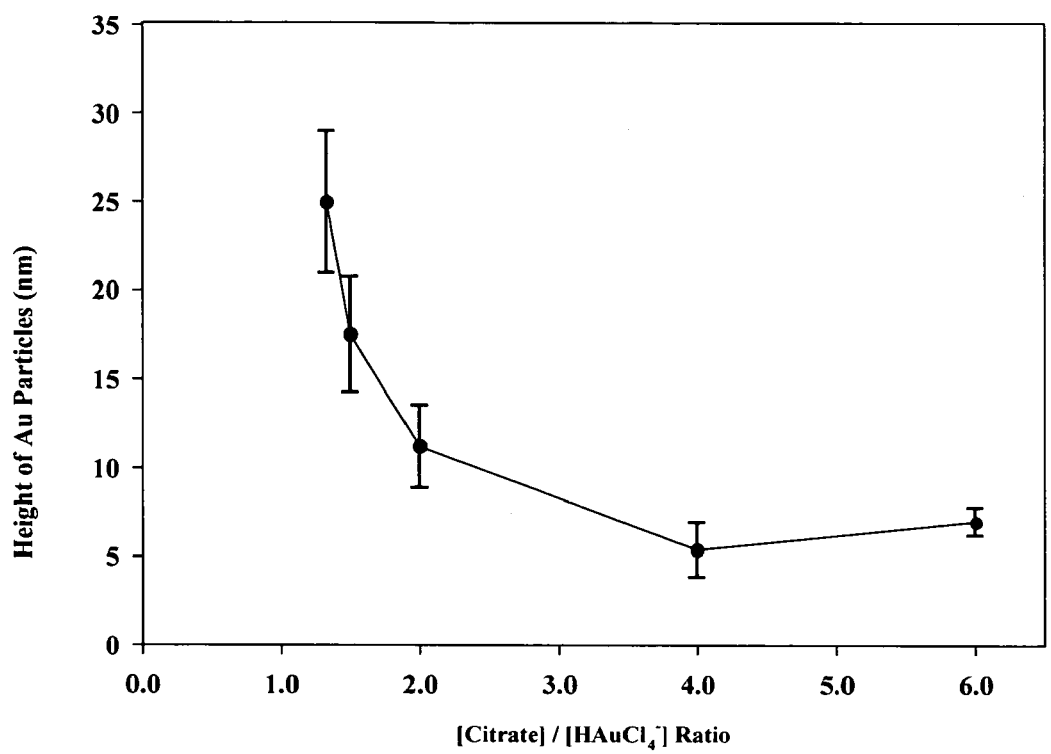
FIG. 5 is a graph illustrating the effect of the concentration ratio of sodium citrate/$HAuCl_4$ on the size of gold nanoparticles as determined by AFM.

As shown in FIG. 5, altering the concentration ratio of sodium citrate to tetrachloroaurate used for the reduction reaction also changed the particle size. In the presence of 15 mM β-CD the particle size increased from 5.4 nm to 25.0±6.9 nm (n=827) as the concentration ratio of citrate:gold was decreased 3-fold from 4:1 to 1.3:1. However, increasing the sodium citrate:gold concentration ratio from 4:1 to 6:1 exhibited insignificant effect on the size. Similar effects of the sodium citrate to gold concentration ratio on gold nanoparticle size have been reported previously by Frens [supra]. At ratios of citrate:gold less than 1.3:1, the solutions became murky an indication that as the gold nanoparticle size became larger, i.e. the particle density was too high for the particles to remain soluble in solution. At a ratio of 1:1 the particle size seemed to be in the range of 40-50 nm, but the analysis was not very reliable because the particle size distribution was quite large (±15 nm). Reducing the concentration of the components of the reduction reaction four-fold (gold 0.25 mM, citrate 1.0 mM) exhibited no impact on the size of the particles, i.e., only the ratio of the components was critical in determining the size of gold nanoparticles. Similarly, if the concentration of the β-CD was also reduced from 15 mM to 3.75 mM, the particle size was not altered, indicating that the ratio of β-CD to gold was critical, not the absolute β-CD concentration.

Fate of the Cyclodextrins

Figure 6:
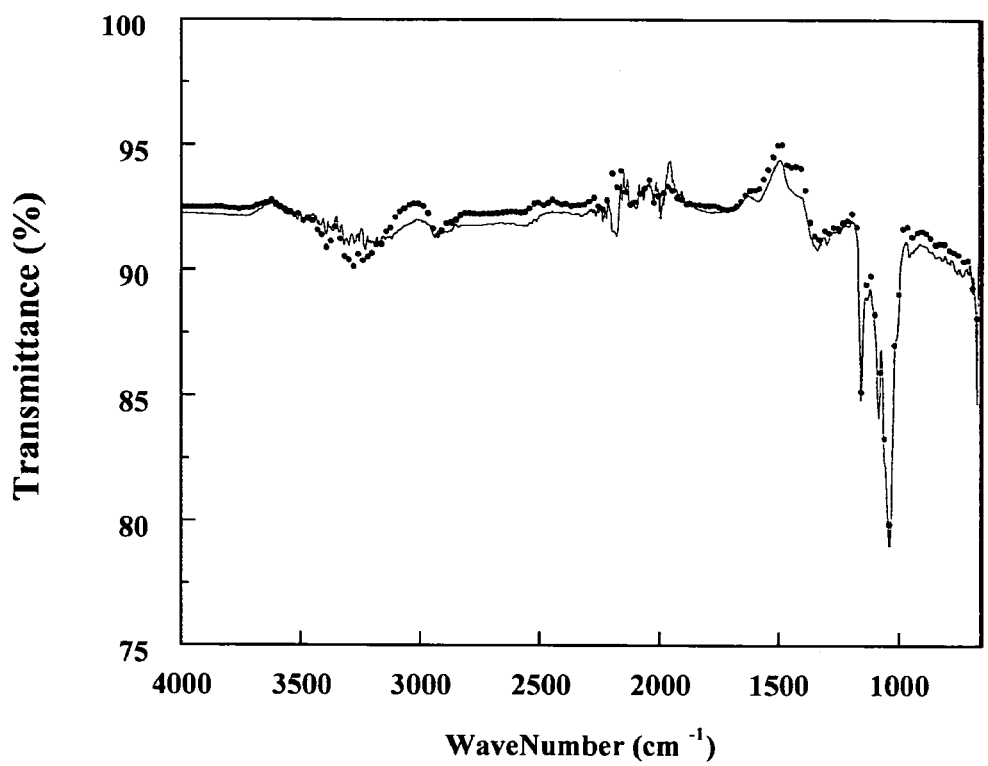
FIG. 6 shows FT-IR spectra of 25 mM α-CD (solid line); and gold nanoparticles in the presence of 25 mM α-CD (closed circle, 20% of data)

FT-Raman, FT-IR spectroscopy, and mass spectrometry were used to follow the role of the cyclodextrins during the reduction of tetrachloroaurate by sodium citrate. Mass spectrometry data confirmed that the gold colloid samples prepared in α, β and γ-CD, respectively still exhibited molecular masses corresponding to 972, 1135, and 1297, the molecular weight of the three CD molecules and there were no other peaks recorded. Consequently, CDs were considered intact during the course of the tetrachloroaurate reduction. FT-IR measurements were conducted to probe any possible gold-CD interactions. It should be noted that the spectra of gold nanoparticles alone was featureless and revealed only a flat baseline. The spectra of 14 mM β-CD in the presence and absence of the gold nanoparticles were virtually identical (FIG. 6) and similar spectra were observed with α-CD and γ-CD. Therefore, no evidence of Au—O interactions could be deducted from the FT-IR spectra. This point was taken into account since there are 18, 21 and 24 hydroxyl groups for α-CD, β-CD and γ-CD, respectively. [J. Szejti In *Comprehensive Supramolecular Chemistry*; Atwood, J. L.; Davies, J. E. D.; MacNicol, D. D.; Vogtle, F., Eds.; Permagon-Elsevier: New York, 1996; Vol 3, pp 5-40]. In the case of resorcinarenes which also stabilize gold nanoclusters, binding of the gold atoms by chemisorption through Au—O interactions was suggested from surface-enhanced Raman spectroscopy (SERS) [K. B. Stavens et al *A Langmuir* 1999, 15, 8337]. Therefore, FT-Raman measurements were taken in an attempt to probe the interaction between gold and the primary macrocyclic structure of the CDs as discussed below.

CDs have been known to form inclusion complexes with various small hydrophobic molecules and the internal diameters of the apolar cavities of α-CD, β-CD and γ-CD are 570, 780, and 950 pm, respectively [Szejtli, supra]. With such dimensions, it would be possible for single hydrophobic gold atoms (288 pm in diameter) or small gold nanoclusters to be enclosed in the CD cavity to form an inclusion complex [Kabashin et al, supra]. Indeed, it has also been reported that the apolar rhodium nanoparticles [M. Komiyama et al *Bull. Chem. Soc. Jpn* 1983, 56, 2883] and Pd colloids [I. Willner *J. Am. Chm. Soc.* 1989, 111, 1330] are stabilized by hydrophobic cavities of a number of CDs and β-CDs, respectively. Inclusion of gold atoms in the CD cavities would remove them as an available feedstock for nanoparticle growth, thus ultimately reducing the particle size.

Figure 7:
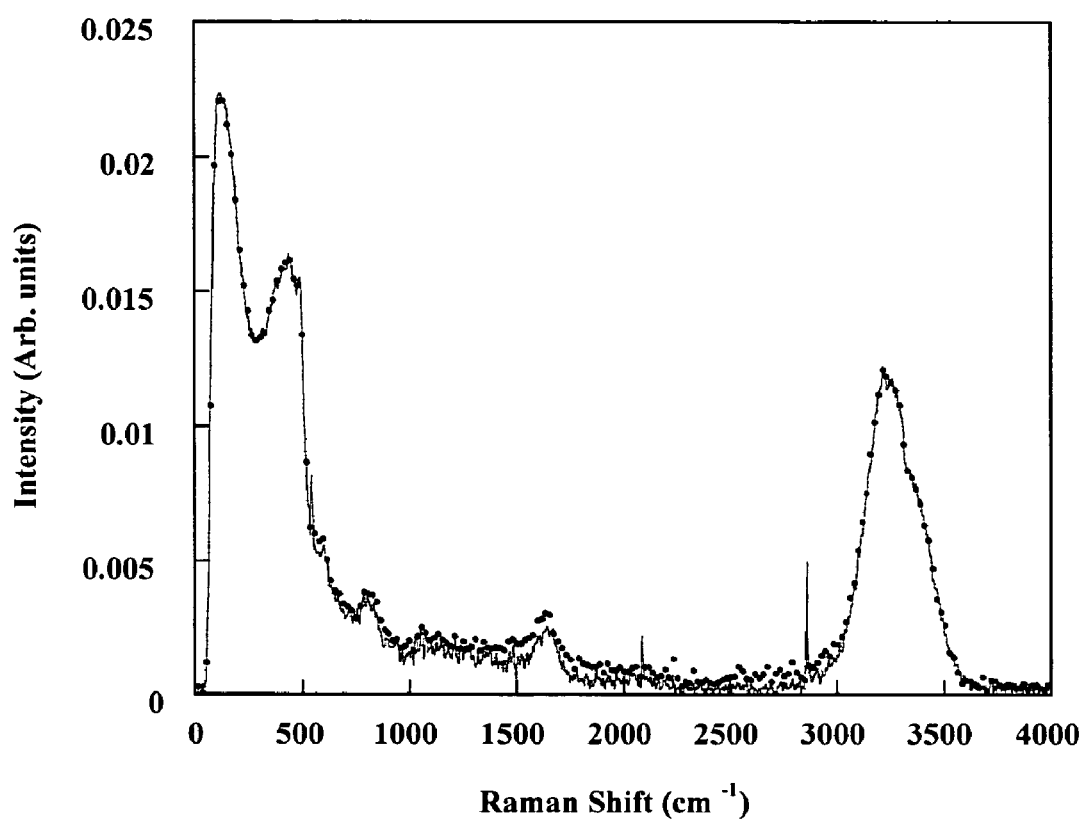
FIG. 7 shows FT-Raman spectra of 15 mM β-CD (solid line) and 15 mM β-CD with gold nanoparticles (closed circle, 10% of data)

No reduction in the intensity of the low-frequency β-CD modes corresponding to pyranose ring vibrations along the backbone of CD [Wiedenhof et al *Die Starke* 1969, 21, 119] was observed following the production of gold nanoparticles (FIG. 7). A dampening of these modes would suggest an interaction between gold and the primary macrocyclic structure of the CDs, suggesting that a small number of gold atoms could be held within the hydrophobic cavity of the CDs. This dampening effect was noted in the case of gold nanoparticles (2-2,4 nm) fabricated using femtosecond laser ablation in an aqueous solution of 10 mM β-cyclodextrin [Kabashin et al, supra]. Since dampening was not observed with citrate reduction, it was unlikely that gold atoms were included in the CD cavities, implying that the rapid reduction of the tetrachloroaurate solution by sodium citrate prevented this inclusion complexation step. Therefore the reduction of the gold nanoparticle size in the presence of CDs was more likely attributed to the hydrophobic interactions between the hydrophobic cavity CDs and large gold nanoparticles rather than the inclusion of gold atoms or small gold nanoparticles in the CD cavities. Hydrophobic-hydrophobic interactions were responsible for the solubilization of very large polyaromatic hydrocarbons (PAHs) by various cyclodextrins [K. B. Male et al *Enz. Microbial Tech.* 1995, 17, 607]. These large molecules cannot fit into the hydrophobic cavities of the CDs because they have sizes incompatible with the dimensions of the cavity. However, they become soluble in CDs because a certain groups of side chains of such PAHs might be able to penetrate into the CD hydrophobic cavity to display hydrophobic interactions. Therefore, the inventors reason that the large gold nanoparticles obtained in this study cannot fit into the CD cavities but they can be situated on the top of the CD cavity to form another form of complexation. Due to such hydrophobic interactions with the CDs, gold nanoparticles are less likely to agglomerate with other nanoparticles which will result in a smaller particle size. The resulting nanoparticles were much smaller and more stable with an increase in the CD concentration implying that hydrophobic interactions between gold nanoparticles and CD molecules were of sufficient strength to prevent agglomeration. Very recently, surfactants such as resorcinarenes [Stavans et al supra] and SDS [F. Mafune et al *J. Phys. Chem. B*. 2001, 105, 5114] have been used to stabilize gold nanoclusters. The surface of gold nanoparticles would be completely covered by negatively charged SDS which renders such particles not as useful for chemical modifications or biosensing applications, due to both ionic repulsion and the known denaturing effects of SDS with respect to enzymes and proteins. Gold nanoparticles in the presence of neutral cyclodextrins are not subject to such shortcomings as encountered by SDS coated gold nanoparticles.

Preparation of Gold Particles using Sodium Borohydride

Figure 8:
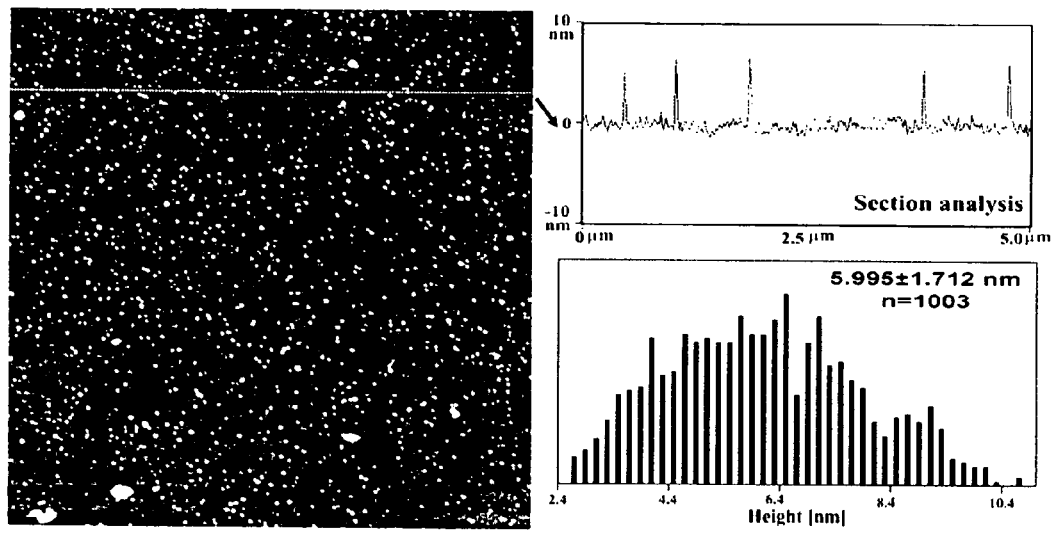
FIG. 8(A) shows an AFM micrograph of gold nanoparticles diluted 100-fold; height image-x,y-scale of 5 µm and section analysis and (B) an AFM micrograph of gold nanoparticles diluted 200-fold; height image-2,y-scale of 5 µm and section analysis.
Figure 8:
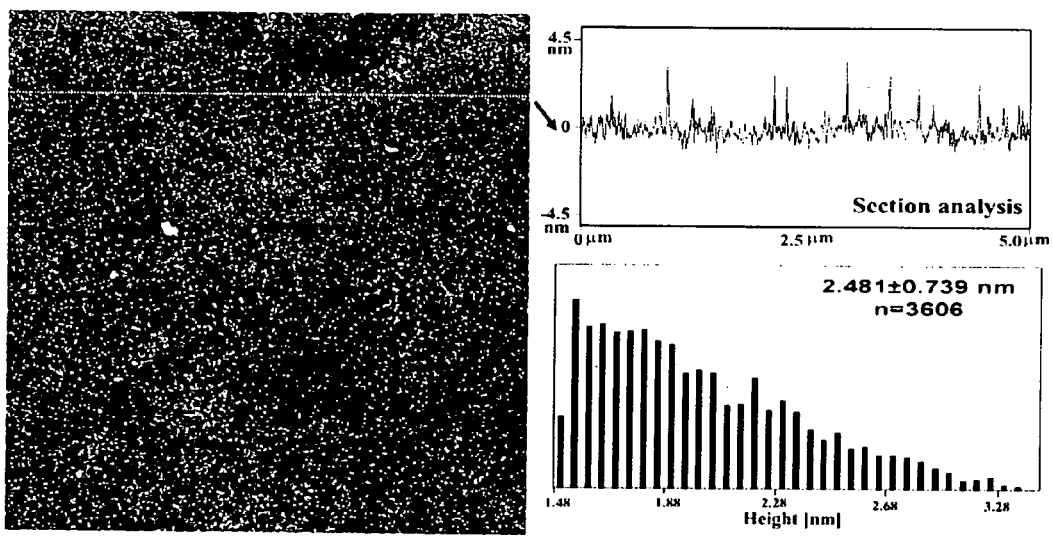

As shown in FIG. 8A, gold nanoparticles having a particle size of 6.0±1.7 nm (n=1003) were formed by the reduction of hydrogen tetrachloroaurate (III) trihydrate with sodium borohydride. As illustrated in FIG. 8B, the addition of 10 mM β-CD significantly reduced the particle size to 3.1±0.9 nm (n=3161) and similar effects were seen with 10 mM α-CD (2.0±0.9 nm, n=3702) and 10 mM γ-CD (2.4±0.8 nm, n=2699). The gold nanoparticle sizes determined in the presence of cyclodextrins were very close to the detection limit of the AFM technique, since the largest surface height difference for the PDDA substrate was determined to be 0.8 nm and these particles are in the range of 2.0-3.0 nm such that the S/N =3. Although the particle distribution curves have lost some of their Gaussian shape for the three cyclodextrin samples, no gold nanoparticles were observed above 4.0 nm.

Figure 9:
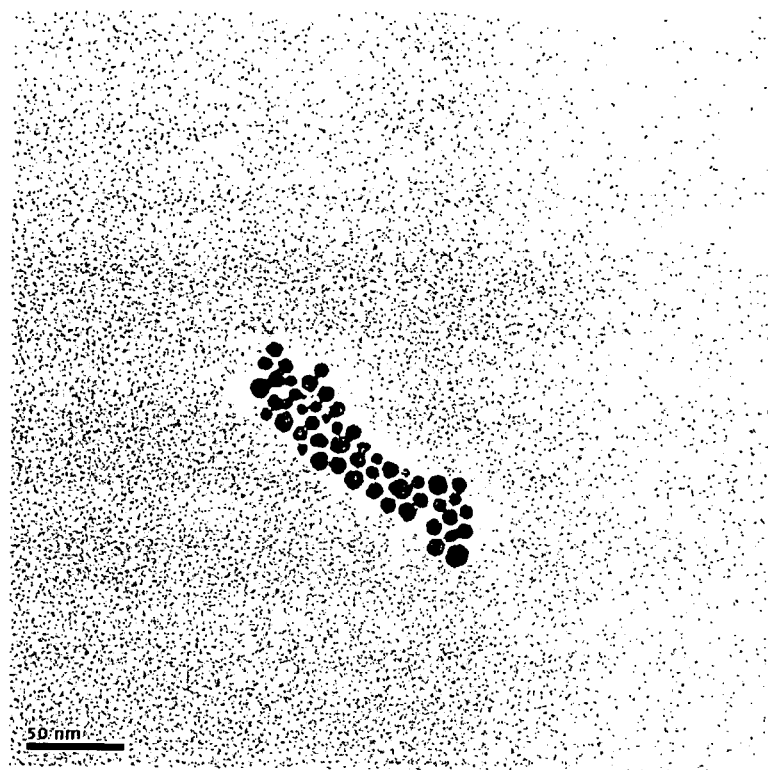
FIG. 9 shows TEM micrographs of gold nanoparticles taken at 200 kV.
Figure 9:
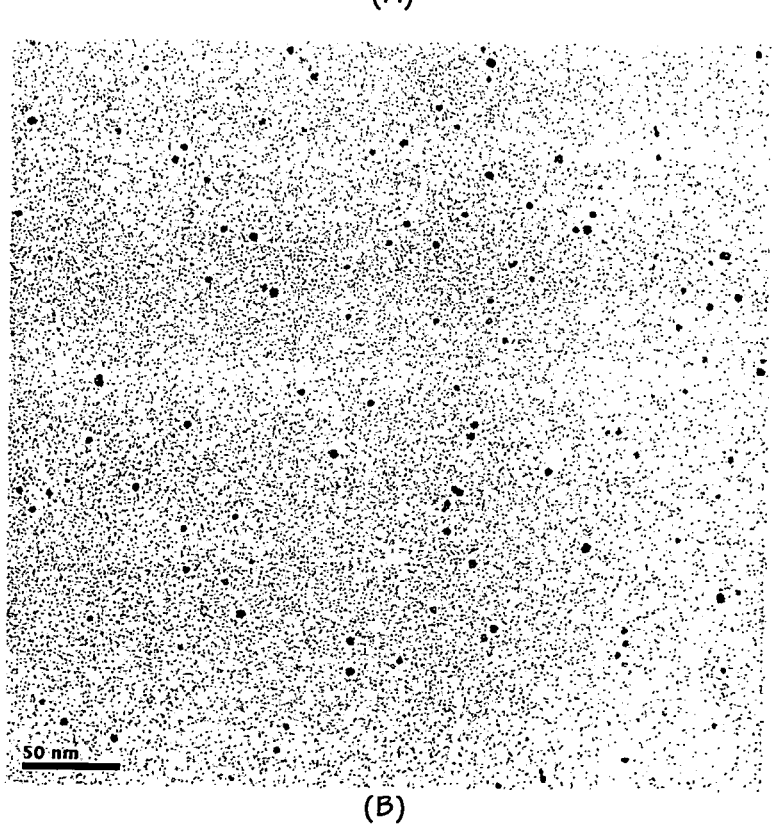

As clearly indicated from the TEM micrographs of the gold nanoparticles produced by sodium borohydride reduction in the absence of cyclodextrin (FIG. 9A) and in the presence of 10 mM β-CD (FIG. 9B), reduction of gold solution by sodium borohydride in the presence of cyclodextrin reduced the gold nanoparticle size significantly. Two images were analyzed for each sample and the particle size was determined to be 7.4±0.8 nm (n=94) in the absence of cyclodextrins. In the presence of 10 mM α-CD, β-CD and γ-CD, the particle sizes were, 3.7±0.7 nm (n=80), 3.7±0.8 nm (n=150) and 3.4±0.9 nm (n=81), respectively. These results indicated that the presence of cyclodextrins during the reduction of hydrogen tetrachloroaurate (III) trihydrate reduced the gold nanoparticle size regardless of which reducing agent was used, sodium borohydride or sodium citrate.

In summary, this invention is believed to be the first attempt to prepare gold nanoparticles by chemical reduction in the presence of unmodified cyclodextrins. On the basis of data obtained using UV-vis, FT-IR spectroscopy, mass spectrometry and FT-Raman spectroscopy, the formation of gold cluster-cyclodextrin inclusion complex is not evident. Cyclodextrins remain intact during the course of preparation and unlike resorcinarenes [Stavans et al, supra] there is no chemisorption between gold nanoparticles and cyclodextrins. Hydrophobic-hydrophobic interactions between cyclodextrins and gold nanoparticles are suggested as the main rationale behind the stabilization of gold colloids by cyclodextrins.

We claim:

1. A process for producing gold nanoparticles comprising the step of reducing hydrogen tetrachloroaurate (III) trihydrate with a reducing agent in the presence of an unmodified α, β or γ-cyclodextrin, wherein the α or γ-cyclodextrin is employed in a concentration of 25-50 mM to control particle size of the gold nanoparticles to 4.8 ±1.2 nm for α-cyclodextrin or 4.3 ±1.7 nm for γ-cyclodextrin, or the β-cyclodextrin is employed in a concentration of 15 mM to control particle size of the gold nanoparticles to within a range of 4.6-6.1 nm.

2. The process of claim 1, wherein the reducing agent is selected from the group consisting of sodium citrate and sodium borohydride.

3. The process of claim 1, wherein hydrogen tetrachloroaurate III trihydrate is dissolved in water to produce a solution; an unmodified α, β or γ-cyclodextrin powder is added to the solution; the solution is heated to boiling; and sodium citrate is rapidly added to the solution while refluxing.

4. The process of claim 1, wherein sodium borohydride is added to a slowly mixing solution of hydrogen tetrachloroaurate III trihydrate containing an unmodified α, β or γ-cyclodextrin.

5. The process of claim 1, wherein the particle size is further controlled by the concentration of the reducing agent.

* * * * *